UNITED STATES PATENT OFFICE.

SAMUEL F. MATHEWS, OF HARRISBURG, PENNSYLVANIA.

IMPROVEMENT IN PAINT COMPOUNDS.

Specification forming part of Letters Patent No. 125,972, dated April 23, 1872.

Specification describing a new and useful Improvement in Paint Composition, invented by SAMUEL F. MATHEWS, of Harrisburg, in the county of Dauphin and State of Pennsylvania.

This invention relates to paints for covering and preserving various substances; and consists in a composition consisting of the ingredients hereinafter described, combined in the manner set forth.

In carrying out my invention, I proceed as follows: In the first place, I take a given quantity of pure India rubber, which I macerate with any of the known solvents, such as bisulphide of carbon, naphtha, &c., until a thick pasty or semi-fluid substance is obtained, which I then dissolve in linseed-oil moderately heated to a degree sufficient to evaporate the first solvent, and to obtain a clear solution of the rubber and oil. The proportion of rubber in this solution will be about one-fourth of a pound in a gallon of oil. This solution I now grind with pure graphite until I obtain a thick homogeneous compound of the consistence of common paint, the proportion of graphite to the oil and rubber solution being governed by the above result. Any desired coloring matter may now be added to give the paint the desired shade.

The paint possesses the quality of resisting in a peculiar degree the action of ordinary corrosive agents, such as water and the atmospheric gases, usually so destructive to common paint. The oil being thoroughly impregnated with the resisting qualities of the rubber, and being in combination with an indestructible form of carbon, forms a coating on wood or metal in itself nearly indestructible.

I do not limit or confine myself to any particular proportions of the ingredients named, as the proportions as well as the manner of combining them may be varied without departing from my invention.

Having thus described my invention, I claim as new and desire to secure by Letters Patent—

The paint composition above described, substantially as specified.

SAMUEL F. MATHEWS.

Witnesses:
FRANK A. DUEY,
HENRY S. SOURBEER.